United States Patent
Rydh

[15] 3,681,400
[45] Aug. 1, 1972

[54] PROCESS FOR THE PREPARATION OF SALTS OF AN OPTICALLY ACTIVE AMINE AND D(−)-α-AZIDOPHENYLACETIC ACID

[72] Inventor: Thore Oskar Verner Rydh, Sodertalje, Sweden

[73] Assignee: Astra Lakemedel Aktiebolag, Sodertalje, Sweden

[22] Filed: Sept. 11, 1969

[21] Appl. No.: 857,219

[30] Foreign Application Priority Data
Dec. 4, 1968 Sweden..................16548/68

[52] U.S. Cl.................................260/349
[51] Int. Cl...............................C07c 117/00
[58] Field of Search..........................260/349

[56] References Cited
UNITED STATES PATENTS
3,461,164   8/1969   Schulte et al. ............260/349 X Primary Examiner—John M. Ford
Attorney—Brumbaugh, Graves, Donohue & Raymond

[57] ABSTRACT

A new process for the preparation of the 1-ephedrine salt of D(−)-α-azidophenylacetic acid is prepared by reacting 1 mole of DL-azidophenylacetic acid with 0.6 mole of 1-ephedrine in a liquid reaction medium in the presence of a substance which increases the solubility of the slats of 1-ephedrine and the two optical isomers of α-azidophenylacetic acid. A product of high optical purity is obtained in a single step.

12 Claims, No Drawings

PROCESS FOR THE PREPARATION OF SALTS OF AN OPTICALLY ACTIVE AMINE AND D(—)-α-AZIDOPHENYLACETIC ACID

The present invention relates to a process for the preparation of salts of an optically active amine and D(—)-α-azidophenylacetic acid and particularly for the preparation of the l-ephedrine salt of D(—)-α-azidophenylacetic acid. The D(—)-epimer of α-azidophenylacetic acid which according to known methods may be obtained from the amine salts mentioned above is used in the production of antibiotically active D(—)-α-azidobenzylpenicillin in industrial scale. The D(—)-epimer of α-azidophenylacetic acid is also used as starting material for the preparation of D(—)-α-aminophenylacetic acid which in its turn is used as a starting material for the preparation of ampicillin.

According to processes proposed heretofore 1 mole of azidophenylacetic acid is reacted with 1 mole of an optically active amine, e.g. l-ephedrine in preferably lower alcohols, whereafter the product is purified by recrystallization. This method has great technical and economical disadvantages. The azidophenylacetic acid is an unstable compound, which is easily decomposed during the evaporation of the alcoholic mother liquor which is undertaken during the recovery of l-ephedrine f and the racemization of the L(+)-enriched azidophenylacetic acid and the recovery of said acid. The recovery of ephedrine is also involved with losses.

The object of the present invention is to provide a process in which the above-mentioned disadvantages are avoided.

This and other objects are obtained according to the present invention if the reaction is carried out in a solvent or a system of solvents in which the ephedrine salt of the azidophenylacetic acid is sparely soluble. The l-ephedrine salt of D(—)-azidophenylacetic acid in optically pure form may in this way be obtained in high yield if the amount of ephedrine is lowered from 1 mole/mole of acid to less than about 0.6 mole/mole and preferably to at most 0.5 mole of ephedrine/mole of acid. The amount of ephedrine in the mother liquor will in this case become very small and may also be recovered in very good yields by a simple extraction. At the same time the L(+)-azidophenylacetic acid in the mother liquor may be racemized and recovered without any evaporation attended with losses.

Examples of applicable solvents are water, benzene, toluene, ligroin, trichloroethylene, ethyl acetate, pentanols and butanols.

Even if several different types of solvents and mixtures of solvents in principle may be useful, some are to be preferred for technical and economical reasons. The economy of the process is depending not only of the factors earlier discussed but also of the productivity expressed in e.g. kg of product/m³ of apparatus and hour as well as the costs for proceedings and apparatus with a view to eliminating risks of fire and explosion. Besides the reproducability of the process is very essential which means that batches of low quality, i.e. with low optical purity, should have very low probability.

The yield and the quality (the optical purity) is principally determined by the proportion mole of ephedrine/mole of azidophenylacetic acid and the properties of the solvent. It has appeared according to the invention that water in principle will comply with most of the demands which can be made upon an optimal solvent. However experiments show that the demands for a high reproducability and productivity not can be complied with by pure water. The reason to this is that the ephedrine salts of the two epimers are so sparely soluble in pure water that the probability for the precipitation of L(+)-azidophenylacetic acid ephedrine salt is very high and when seed crystals of this form once have formed the product will be optically strongly contaminated.

It has now according to the present invention been shown that this disadvantage with water as the solvent can be eliminated by the addition of solubilizing agents to the solvents in which the ephedrine salt is very sparely soluble. Such an addition improves namely their reproducability and the optical purity to an essential extent.

As solubilizing agent compounds which have some but not unlimited solubility in the solvents from which the ephedrine salt will be brought to crystallized may be used. Such compounds include impurities in azidophenylacetic acid of poor quality or compounds of the type lower alkanols, ethers, e.g. dioxane, lower alkyl esters, e.g. ethyl acetate, and polyalcohols, e.g. glycerol. Impurities in azidophenylacetic acid of poor quality may be compounds, such as benzaldehyde, mandelic acid and phenylglyoxylic acid, which are found as impurities in the starting material for the synthesis of azidophenylacetic acid and especially in bromophenylacetic acid or which are formed by side reactions e.g. by decomposition of bromophenylacetic acid and azidophenylacetic acid.

In a preferred embodiment water mixed with a lower alkanol e.g. isopropanol or a butanol, is used as the medium, but also other solvents will give good results as is shown by the subsequent specific examples, which illustrate the principles and practice of the instant invention.

EXAMPLE 1

45 g of azidophenylacetic acid were dissolved in 225 ml of water containing an equivalent amount of sodium hydroxide. The solution was diluted with 45 g of isopropanol.

While stirring 19.5 g of l-ephedrine hydrochloride (37 mole percent) dissolved in 95 ml of water were added uniformly over 3 hours. When about 5 percent were added inoculation was carried out using optically pure D(—)-α-azidophenylacetic acid ephedrine salt. After the addition of ephedrine chloride stirring was continued for one more hour whereafter the substance was filtered off and washed with 25 ml of water.

Yield: 56 percent of the D-acid of the DL-acid charged.

Optical purity: 98 percent.

EXAMPLE 2

45 g of azidophenylacetic acid were dissolved in 225 ml of trichloroethylene mixed with 12 ml of isopropanol and 15 g of triethylamine at about 35°C. While stirring a solution of 16 g of ephedrine base (37 mole percent) dissolved in 95 ml of trichloroethylene was added uniformly over 2 hours. During this addition inoculation was performed now and then using optically pure ephedrine salt until the seed remained undissolved. The mixture was cooled while stirring was continued and the substance which crystallized was filtered off and washed with ice-cooled trichloroethylene.

Yield: 50 percent calculated on the D-acid of the DL-acid charged.

Optical purity: 94 percent.

Yield and optical purity at different additions to the water at an amount of ephedrine of 0.37 mole/mole of acid is evident from Table I which also shows the results which were obtained with other solvents than water. From the table it is also seen that at an added amount of isopropanol which is equal to the amount of azidophenylacetic acid (about 10–15 percent of isopropanol in the solvent) very good results from technical and industrial point of view were obtained when using water as the crystallization agent. It may also be pointed out that an aqueous system is to be preferred besides for high productivity, reproducability and safety also because ephedrine normally is sold in the form of a salt and is easily recovered in that form and that a process in which D(−)-α-azidophenylacetic acid is enriched from the racemic mixture in aqueous surroundings makes it possible to use those aqueous solutions of salts of azidophenylacetic acid which are most commonly obtained in the synthesis of this compound.

TABLE 1

Yield and optical purity of the 1-ephedrine salt of D(−)-α-azidophenylacetic acid at the addition of 0.37 mole of ephedrine /mole of azidophenylacetic acid.

| Solvent | Solubilizing agent | | Yield | | Optical purity % |
|---|---|---|---|---|---|
| Kind | | Concentration % weight/ weight | Salt calculated on added amount of D(−)-α--azidophenylacetic acid in the form of racemate % | Ephedrine calculated from added amount of ephedrine % | |
| Water | – | – | varying (40–70) | varying | varying (50–90) |
| " | iso-propanol | 4.2 | 66 | 89 | 83 |
| " | " | 6.6 | 60 | 81 | 94 |
| " | " | 9.6 | 58 | 79 | 95–100 |
| " | " | 12 | 56 | 76 | 98–100 |
| Water | butanol | 1.2 | 66 | 89 | 83 |
| " | " | 3 | 60 | 81 | 93 |
| " | " | 4.8 | 57 | 78 | 97 |
| Water | dioxane | 6.6 | 56 | 76 | 96 |
| " | ethyl acetate | 6.6 | 52 | 70 | 97 |
| " | glycerol | 6.6 | 63 | 85 | 91 |
| Trichloroethylene | – | – | 50 | 68 | 90 |
| " | iso-propanol | 3 | 40 | 54 | 93 |
| Benzene | iso-propanol | 3 | 50 | 68 | 94 |
| Ligroin | n-butanol | 6 | 45 | 55 | 88 |

By the processes earlier described which are using repeated recrystallizations an optical purity of 90 percent at a maximum yield of 65 percent calculated on ephedrine could be obtained. It may be seen from the table that higher optical purities and yields calculated on ephedrine may be obtained according to the single stage process of the present invention than according to the known processes.

While specific examples of solvents and solubilizing agents have been described above, it will be apparent to those skilled in the art that there are equivalents and variations within the scope of the present invention as set forth in the following claims.

I claim:

1. A process for the preparation of the 1-ephedrine salt of D(−)-α-azidophenylacetic acid by reaction between DL-azidophenylacetic acid in the form of the free acid or a salt thereof and 1-ephedrine or a salt thereof in a liquid reaction medium, in which process 1-ephedrine or a salt thereof is added in an amount of at most 0.6 mole/mole of DL-α-azidophenylacetic acid, and to the liquid reaction medium a substance is added in an amount sufficient to increase the solubility of the salts of 1-ephedrine and the two optical isomers of α-azidophenylacetic acid and thereby suppresses the precipitation of the 1-ephedrine salt of L(+)-α-azidophenylacetic acid and which substance is selected from the group consisting of lower alkanols, ethers, lower esters, polyalcohols, or impurities occurring in azidophenylacetic acid of poor quality which are selected from the group consisting of benzaldehyde, mandelic acid, and phenylglyoxylic acid, and thereafter the D(−)-α-azidophenylacetic acid 1-ephedrine salt is selectively crystallized by the addition of seed crystals of said D(−)-α-azidophenylacetic acid 1-ephedrine salt.

2. A process for the preparation of the 1-ephedrine salt of D(−)-α-azidophenylacetic acid by reaction between DL-azidophenylacetic acid in the form of the free acid or a salt thereof and 1-ephedrine or a salt thereof in a liquid reaction medium, in which process 1-ephedrine or a salt thereof is added in an amount of at most 0.6 mole/mole of DL-α-azidophenylacetic acid, and to the liquid reaction medium a substance is added in an amount sufficient to increase the solubility of the salts of 1-ephedrine and the two optical isomers of α-azidophenylacetic acid and thereby suppresses the precipitation of the 1-ephedrine salt of L(+)-α-aziodophenylacetic acid and which substance is selected from the group consisting of lower alkanols, ethers, lower esters, polyalcohols, and thereafter the D(−)-α-azidophenylacetic acid 1-ephedrine salt is selectively crystallized by the addition of seed crystals of said D(−)-α-azidophenylacetic acid 1-ephedrine salt.

3. Process according to claim 2, wherein the reaction medium is water.

4. A process according to claim 2, wherein the reaction medium is selected from the class consisting of organic solvents which do not have unlimited solubility in water.

5. A process according to claim 2, wherein the solubilizing agent is added in an amount of at most 33 percent (weight/weight) and not less than 1 percent (weight/weight), calculated on the weight of the liquid reaction medium.

6. A process according to claim 3, wherein the solubilizing agent is selected from the group consisting of lower alkanols and glycerol.

7. A process according to claim 4, wherein the solvent is trichloroethylene and the solubilizing agent is isopropanol.

8. A process according to claim 4, wherein the solvent is benzene and the solubilizing agent is isopropanol.

9. A process according to claim 4, wherein the solvent is ligroin and the solubilizing agent is n-butanol.

10. A process according to claim 3, wherein a l-ephedrine salt is used at the crystallization.

11. A process according to claim 2, wherein the DL-α-azidophenylacetic acid which is used as starting material for the resolution of the racemate is added to the reaction solution in the form of a salt.

12. A process according to claim 2, wherein the resolution of the racemate is carried out at a temperature not higher than +60°C.

* * * * *

PO-1050
(5/69)

UNITED STATES PATENT OFFICE
CERTIFICATE OF CORRECTION

Patent No. 3,681,400      Dated August 1, 1972

Inventor(s) Thore Oskar Verner Rydh

It is certified that error appears in the above-identified patent and that said Letters Patent are hereby corrected as shown below:

First Page, Column 2, In the Abstract, line 6, "slats" should read -- salts --;
Column 1, line 26, delete "f";
Column 3, line 33 (Table 1) center "Yield" between 3rd & 4th columns;
Column 3, line 41, remove "race-" from Column 1 to Column 3.

Signed and sealed this 26th day of December 1972.

(SEAL)
Attest:

EDWARD M. FLETCHER, JR.              ROBERT GOTTSCHALK
Attesting Officer                      Commissioner of Patents